Nov. 19, 1935.    L. A. GRENNAN    2,021,303
PLANT PROP
Filed Aug. 5, 1935
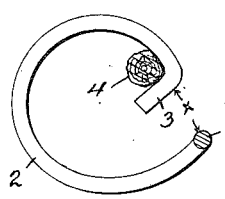
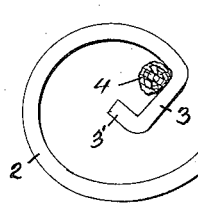
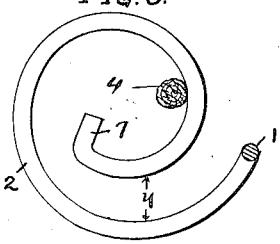
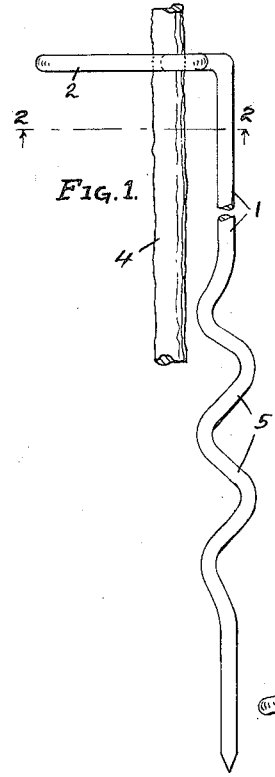
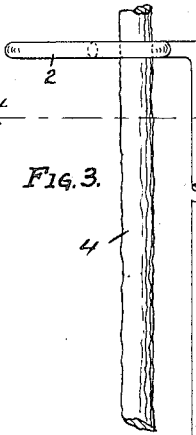
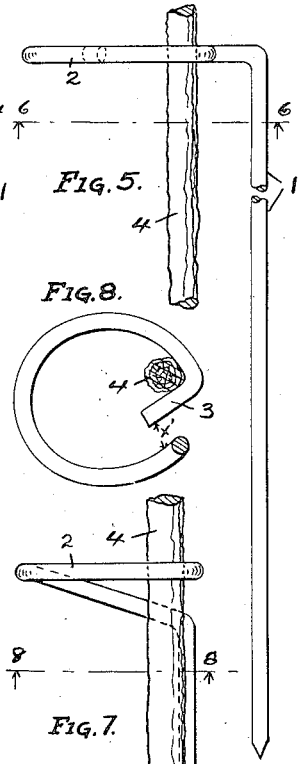
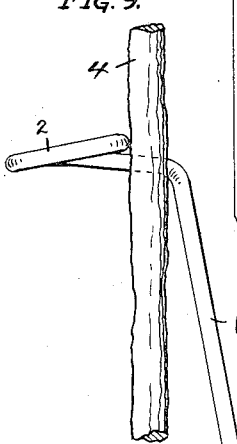
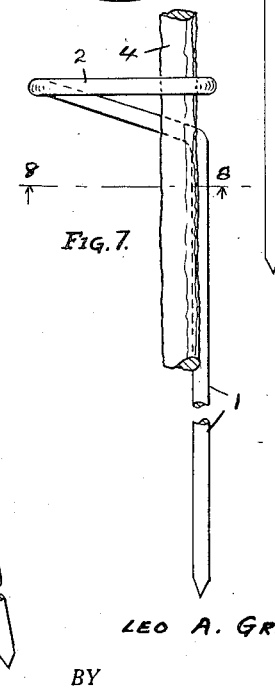
INVENTOR.
LEO A. GRENNAN
BY
Miller Boyken & Bried
ATTORNEY.

Patented Nov. 19, 1935

2,021,303

UNITED STATES PATENT OFFICE 2,021,303

PLANT PROP

Leo A. Grennan, Oakland, Calif.

Application August 5, 1935, Serial No. 34,761

7 Claims. (Cl. 47—47)

This invention relates to a plant prop or stalk support and has for its objects an improved plant prop that is easily and quickly inserted into the ground at its lower end and with its upper end embracing the stalk and which prop is formed with means insuring against unintentional release of the stalk from the upper end of the prop under normal conditions when the plant is subjected to the effect of wind, rain, artificial sprinkling and the like. Another object is to provide a prop of the above character in which the prop is adapted to be disposed close to the stalk of the plant while permitting ample space for the stalk to grow without restriction of any portion thereof. Other objects and advantages will appear in the specification and drawing.

Fig. 1 is an elevational view of one of my props partially broken in length and showing a portion of a plant stalk in position.

Fig. 2 is a sectional view of Fig. 1 as seen from the line 2—2 thereof.

Fig. 3 is a view similar to that of Fig. 1 of a slightly different form of plant prop.

Fig. 4 is a sectional view of Fig. 3 as seen from the line 4—4 thereof.

Fig. 5 is a view similar to that of Figs. 1 and 3 of a modified form of prop.

Fig. 6 is a sectional view of Fig. 5 as seen from the line 6—6 thereof.

Fig. 7 is a view similar to that of Figs. 1, 3, and 5 of a still further modified form of device.

Fig. 8 is a sectional view of Fig. 7 as seen from the line 8—8 thereof.

Fig. 9 is an elevational view of the form of device of Fig. 7 showing the initial manner of positioning the prop to engage the stalk within the upper end of the prop prior to forcing the lower end of the prop into the ground.

In the drawing, Figs. 1 and 2, my prop comprises a round wire of relatively heavy gauge having a vertically extending main stem 1 bent at its upper end to form a horizontally disposed, generally circular, loop 2 having a free end 3 spaced from the juncture of the loop and stem a distance $x$ to permit passing of the stem 4 of a plant to within the loop.

The free end 3 of the loop is turned sharply inwardly and generally radially of the loop to provide a stop for preventing the stem 4 from passing out of the loop through space. In installing the prop, the stem 4 is passed through space $x$ to within the loop and then the stem of the prop is rotated so as to bring the stalk into engagement with the straight end 3 in which position the stalk is positioned in engagement with the loop and end 3 at their juncture, and the stem of the prop when the stalk of the plant is so positioned lies close to the stalk. The lower end of the prop stem is then forced into the ground, and between the roots of the plant adjacent the main stalk, thus giving greater stability than heretofore where the prop are of necessity considerably spaced from the stalk, and also the prop is rendered relatively inconspicuous.

The stem 1 of the prop, in some instances, is bent as at 5 to form undulations, which construction is particularly adapted for use in sand or loose soil, since the sand readily packs around the undulated portion of the stem of the prop and gives a better support for the prop than where the stem is straight. These undulations are preferably disposed in one or several distinct planes as distinguished from spiral form although a relatively steep pitched spiral is readily inserted into the ground, the tendency of the spiral in such case being to rotate the prop in inserting or withdrawing it from the ground.

The device shown in Figs. 3 and 4, insofar as the loop is concerned, shows all of the elements and has all of the advantages of the device of Figs. 1 and 2, and similar parts are similarly numbered. However, in this form the generally radially extending end portion 3 of the loop 2 is continued at 3' at about a right-angle to the direction of the end portion 3, but in the plane of the loop, to even more fully embrace the stalk 4 between portions 3, 3' and the end of the circular loop adjacent the juncture of the end of the loop and end of portion 3.

In Figs. 5 and 6 the loop itself is continued in a horizontal plane past the juncture of the stem 1 and loop to provide a spiral channel at $y$ for insertion of the stalk 4 to within the loop and the free end of the loop, in this view designated as 7, while serving the same function as the end 3 in the previously described figures, does not necessarily engage the stalk when the stalk is in normal position except to act as a stop to prevent the stalk from coming out of the loop.

In Figs. 7 and 8 the same loop is shown as in Figs. 1 and 2 except that it is shown in generally spiral form, and the space $x'$ is decreased so that it is impossible for the stalk to pass out of the loop when once within the loop, but by tilting the prop as indicated in Fig. 9 the stalk may easily be passed to within the loop without distorting the prop by bending the loop or the like, and once the stalk is within the loop the stem of the prop is moved to vertical position and turned to position the stalk adjacent the end 3 and close to the stem of the prop when the stem is forced into the ground. Of course, in using heavier gauge wire it is practically impossible for the operator to attempt to bend the loop to close the gap or space allowed for insertion of the stalk, and it has been found that in the props of lighter gauge wire such attempts very frequently result in the operator breaking the stalk of the plant.

Heretofore many attempts have been made to provide plant props with loops at their upper ends to embrace the stalks of plants but the frequent occurrence of the stalk slipping out of the loop when the plant is sprinkled or when there is a wind, has proven to be an objection to their use and plant growers have resorted to the old well-known practice of a stake and a string.

The various forms of plant props shown in the drawing in this application have overcome this objection and except for the deliberate manual manipulation of the plants or plant props, the stalks of the plants do not come out of the loop of the kinds shown in the drawing, all of which incorporate the provision of the generally radially extending portion 3 at the free end of the loop. This is a particularly important feature of my invention, and, furthermore, it is to be noted that this portion forms an angle seat adjacent the stem or stake-portion of the prop whereby the vertical stake-portion of the prop is adapted to be positioned close to the stalk of the plant when the stalk is positioned adjacent the "stop" or end 3 of the loop.

In the claims the term "stake member" will be used to refer to the stem or vertically extending portion of the plant prop adapted for insertion into the ground at its lower end.

Having described my invention, I claim:

1. A plant prop comprising a generally vertically extending stake member provided with a generally horizontally disposed loop at its upper end, said loop being open at one side for passing a plant stalk to within the loop and means on said loop adjacent a side of the opening extending into the area defined by the loop in a direction generally toward the vertical axis of the loop adapted to engage the plant stalk against accidental withdrawal from within the loop.

2. A plant prop comprising a generally vertically extending stake member bent at its upper end to form a generally horizontally disposed loop with an opening at one side thereof for insertion of a plant stalk to within the loop, one of the ends of said loop at said opening being bent inwardly toward the vertical axis of the loop to provide a stop adapted to engage the plant stalk against accidental withdrawal from within the loop through the opening.

3. In a construction as defined in claim 1, said stake member being bent to form undulations along the portion thereof adapted to be inserted into the ground.

4. In a construction as defined in claim 2, the inwardly bent end of the loop being disposed at a different elevation than the opposite end of the loop on the opposite side of said opening.

5. A plant prop comprising a generally vertically extending stake member bent at its upper end to form a generally horizontally disposed, substantially circular, loop with an opening at one side thereof for insertion of a plant stalk to within the loop, one of the ends of said loop at said opening being bent inwardly to form a substantially straight portion extending generally toward the vertical axis of said loop adapted to engage the plant stalk against accidental withdrawal from within the loop.

6. In a construction as defined in claim 5, said inwardly bent straight portion formed to provide a relatively short hook at its inner free end adapted to coact with said straight portion to prevent accidental withdrawal of the plant stalk when the latter is disposed adjacent the junction of the straight portion and end of the loop at the opening.

7. A plant prop comprising a generally vertically extending stake member bent at its upper end to form a generally horizontally disposed, substantially circular, loop having an opening at one side adjacent the upper end of the stake member between the upper end of the stake member and the free end of the circular loop, a relatively straight member extending from the free end of said loop into the area defined by the loop and in a direction generally toward the vertical axis of the loop, the opening at the side of the loop being adapted to admit insertion of the plant stalk to within the loop and said straight member adapted to form a stop for retaining the plant stalk within the loop against accidental withdrawal therefrom at the end of the loop adjacent the stake member.

LEO A. GRENNAN.